US011110551B1

(12) United States Patent
Song et al.

(10) Patent No.: US 11,110,551 B1
(45) Date of Patent: Sep. 7, 2021

(54) DEVICE FOR PREHEATING BEFORE WELDING AND POST-WELDING HEAT TREATMENT OF TANK

(71) Applicant: Wuhan University of Technology, Wuhan (CN)

(72) Inventors: Yanli Song, Wuhan (CN); Changlin Gao, Wuhan (CN); Dexing Wang, Wuhan (CN); Yipeng Peng, Wuhan (CN)

(73) Assignee: WUHAN UNIVERSITY OF TECHNOLOGY, Wuhan (CN)

( * ) Notice: Subject to any disclaimer, the term of this patent is extended or adjusted under 35 U.S.C. 154(b) by 0 days.

(21) Appl. No.: 17/209,857

(22) Filed: Mar. 23, 2021

(30) Foreign Application Priority Data

Mar. 25, 2020 (CN) .......................... 202010219785.7

(51) Int. Cl.
*B23K 31/00* (2006.01)
*B23K 31/02* (2006.01)
(Continued)

(52) U.S. Cl.
CPC ........ *B23K 31/027* (2013.01); *B23K 37/0426* (2013.01); *C21D 9/08* (2013.01);
(Continued)

(58) Field of Classification Search
CPC .............. B23K 31/027; B23K 37/0426; B23K 2101/12; C21D 9/08; C21D 9/50; H05B 1/023
See application file for complete search history.

(56) References Cited

U.S. PATENT DOCUMENTS 2,184,534 A * 12/1939 Smith .................... B23K 9/035
219/137 R
3,730,373 A * 5/1973 Kozbelt ................. H05B 3/565
219/535

(Continued)

FOREIGN PATENT DOCUMENTS

| JP | 04337278 A | * 11/1992 | |
| JP | 08252682 A | * 10/1996 | ........... B23K 26/262 |

*Primary Examiner* — Kiley S Stoner
(74) *Attorney, Agent, or Firm* — WPAT, PC

(57) ABSTRACT

The invention discloses a device for preheating before welding and post-welding heat treatment of tank. The device includes a first roller, two electric heating belts, calipers, a thermostat, two positioners and hinges. Both of the electric heating belts are arranged around the tank and distributed on both sides of the welded seam. A number of calipers are provided on both sides of each electric heating belt, one end of each caliper can operatively clamp the side of the electric heating belt, another end of each caliper is rotatably connected to a first roller. The hinge is connected to the electric heating belt, and one end of the hinge away from the electric heating belt is in a fixed state. The heating temperature of the electric heating belt is controlled, thereby realizing preheating of the tank before welding, heat preservation during welding and post-welding heat treatment without transferring. The electric heating belt will not rotate with the tank to ensure heat evenly, and the equipment connected with the electric heating belt will not be knotted, which improves the practicability.

10 Claims, 2 Drawing Sheets

(51) Int. Cl.
    *B23K 37/04*    (2006.01)
    *C21D 9/50*     (2006.01)
    *H05B 1/02*     (2006.01)
    *C21D 9/08*     (2006.01)
    *B23K 101/12*   (2006.01)

(52) U.S. Cl.
    CPC ............... *C21D 9/50* (2013.01); *H05B 1/023*
        (2013.01); *B23K 2101/12* (2018.08)

(56) References Cited

U.S. PATENT DOCUMENTS

| | | | | |
|---|---|---|---|---|
| 3,849,871 | A * | 11/1974 | Kaunitz | B23K 9/0282 |
| | | | | 228/169 |
| 4,646,406 | A * | 3/1987 | Weiss | G01K 5/36 |
| | | | | 148/524 |
| 5,674,424 | A * | 10/1997 | Iben | B09C 1/06 |
| | | | | 219/213 |
| 5,714,738 | A * | 2/1998 | Hauschulz | H05B 3/58 |
| | | | | 219/535 |
| 6,054,691 | A * | 4/2000 | McGwire | H05B 3/56 |
| | | | | 219/535 |
| 6,059,319 | A * | 5/2000 | Wyke | B29C 65/344 |
| | | | | 219/535 |
| 2002/0190094 | A1* | 12/2002 | Kazama | B21C 37/08 |
| | | | | 228/17 |
| 2005/0115951 | A1* | 6/2005 | Chen | H05B 3/342 |
| | | | | 219/528 |
| 2006/0163232 | A1* | 7/2006 | Hollander | H05B 3/46 |
| | | | | 219/202 |
| 2018/0243809 | A1* | 8/2018 | Okabe | B23K 13/06 |
| 2019/0219218 | A1* | 7/2019 | Ide | C22C 38/46 |

\* cited by examiner

DEVICE FOR PREHEATING BEFORE WELDING AND POST-WELDING HEAT TREATMENT OF TANK

FIELD OF THE DISCLOSURE

The disclosure relates to a device for preheating before welding and post-welding heat treatment of tank.

BACKGROUND

In a low temperature environment, welded tanks are prone to defects such as cracks and incomplete penetration. Especially for aluminum alloy materials, since its thermal conductivity and thermal expansion coefficient are nearly twice that of carbon steel, welding defects are more likely to occur when welding in a low temperature environment.

At present, tank manufacturers generally use traditional methods such as roasting and warm air to preheat tanks in low temperature environments before welding. After the welding is completed, the tanks are transferred to the heat treatment thermostat for post-weld heat treatment to relief residual stress. The disadvantages of the above-mentioned traditional preheating before welding and post-welding heat treatment processes are: (1) the uneven distribution of preheating temperature affects the welding formability and quality of the tank; (2) due to low efficiency of preheating and high energy consumption of heat treatment, energy waste and production cost are greatly wasted; (3) there are potential safety hazards in the tank transport process, which reduces production efficiency; (4) it is not easy to work with automatic welding equipment.

SUMMARY

The technical problem to be solved by the present invention is insufficient in the prior art. The present invention provides a device that can realize the integration of preheating before welding, heat preservation during welding and post-weld heat treatment of tanks without transferring.

In order to achieve the above objectives, the technical solutions adopted by the present invention are as follows:

The device for preheating before welding and post-welding heat treatment of tank comprises a first roller, two electric heating belts, calipers, a thermostat, two positioners and hinges, wherein:

An active chuck and a driven chuck are coaxially arranged on the two positioners, the active chuck and the driven chuck are arranged oppositely, and the tank is clamped between the active chuck and the driven chuck.

Both of the electric heating belts are arranged around the tank and distributed on both sides of the welded seam, and both are connected to the thermostat through wires.

A number of calipers are provided on both sides of each electric heating belt, one end of each caliper can operatively clamp the side of the electric heating belt, and another end of each caliper is rotatably connected to a first roller whose circumferential surface of the first roller abuts against the circumferential surface of the tank.

At least one hinge is connected to each electric heating belt, and one end of the hinge away from the electric heating belt is in a fixed state.

The electric heating belt includes a number of heating units connected in series through flexible connectors, each of the heating unit includes an outer layer and an inner layer, the outer layer is made of alumina ceramic, and the inner layer is made of nichrome wire.

The calipers includes an upper jaw, a lower jaw, a circular shaft portion and a fastening mechanism; one end of the upper jaw and the lower jaw is fixedly connected to one end of the circular shaft portion, another end of the circular shaft portion is rotatably connected to the first roller, and another end of the upper jaw and the lower jaw respectively clamp the sides of the electric heating belt; the fastening mechanism includes pins, and pin holes are coaxially arranged on the upper jaw and the lower jaw, and both ends of the pin pass through the pin hole to tightly connect the upper jaw and the lower jaw.

The fastening mechanism also includes nuts, the thread of which is matched with the threads at the two ends of the pin; after both ends of the pin pass through the pin hole, the upper jaw and the lower jaw respectively fastened by the nuts.

The fastening mechanism also includes nuts and a rotary latch, one end of the pin is provided with a thread, another end of the pin is hinged with the rotary latch through a pivot, and one end of the pin passes through the pin hole and is fastened to the lower jaw through the nuts; the end of the rotary latch presses against the outer surface of the upper jaw in the locked state.

The middle part of the upper jaw is arc-shaped, the middle part of the lower jaw is ladder-shaped, and pin holes are coaxially arranged on the arc segment of the upper jaw and the first stepped segment of the lower jaw.

The device also includes insulation batt which is arranged between the electric heating belt and the tank, and the insulation batt is fixedly connected to the electric heating belt and abuts against the tank.

Each of the electric heating belts is connected with two hinges, which are oppositely arranged on both sides of the tank.

The device also includes a guide rail, and the two positioners are fixedly arranged on the guide rail.

The device also includes support wheels, which includes a support bracket and a second roller, the support bracket is slidably arranged on the guide rail, and the second roller is rotatably arranged on the upper end of the support bracket; the second roller abuts against the tank, and the axis of the second roller is parallel to the rotation center line of the tank.

The invention provides a device for preheating before welding and post-welding heat treatment of tank. Since the tank is clamped between the active chuck and the driven chuck, the tank body can be welded along with the rotation of the chuck. Two electric heating belts are arranged around the tank body and distributed on both sides of the welding seam. The heating temperature of the electric heating belt is controlled by a thermostat to realize preheating of the tank before welding, heat preservation during welding and post-welding heat treatment without transferring. The electric heating belt is connected to the first roller through calipers, and is tightened by hinges, so that the electric heating belt will not rotate with the tank body and heat evenly. The equipment connected with the electric heating belt will not be knotted, which improves the practicability.

BRIEF DESCRIPTION OF THE DRAWINGS

Accompanying drawings are for providing further understanding of embodiments of the disclosure. The drawings form a part of the disclosure and are for illustrating the principle of the embodiments of the disclosure along with the literal description. Apparently, the drawings in the description below are merely some embodiments of the disclosure, a person skilled in the art can obtain other drawings according to these drawings without creative efforts. In the figures.

In the above figure: (1) tank, (2) insulation batt, (3) first roller, (4) electric heating belt, (5) caliper, (6) power source, (7) thermostat, (8) positioner, (9) support wheel, (10) ground lock, (11) hinge, (12) guide rail, (13) bearing, (14) rotary latch, (15) pivot, (16) pin, (17) upper jaw, (18) lower jaw, (19) nut, (20) eccentric metal plate, (21) counterweighted shank.

DETAILED DESCRIPTION OF PREFERRED EMBODIMENTS

The following will clearly and completely describe the technical solutions in the embodiments of the present invention in conjunction with the accompanying drawings in the embodiments of the present invention. Obviously, the described embodiments are only a part of the embodiments of the present invention, rather than all implementations. example. Based on the embodiments of the present invention, all other embodiments obtained by those of ordinary skill in the art without creative work shall fall within the protection scope of the present invention.

Figure 1:
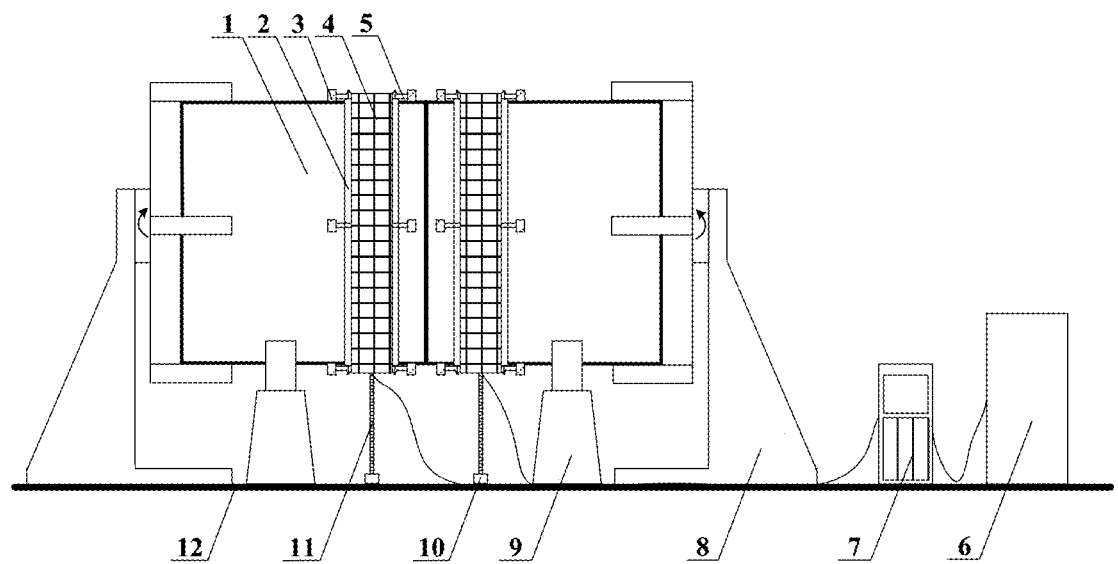
FIG. 1 is an elevation view schematic diagram of the device for preheating before welding and post-welding heat treatment of tank.

As shown in FIG. 1, FIG. 1 is an elevation view schematic diagram of the device for preheating before welding and post-welding heat treatment of tank. The device for preheating before welding and post-welding heat treatment of tank comprises a first roller (3), two electric heating belts (4), calipers (5), power source (6), a thermostat (7), two positioners (8) and hinges (11). An active chuck and a driven chuck are coaxially arranged on the two positioners (8), the active chuck and the driven chuck can be a triangular chuck or a four-angle chuck, and the active chuck and the driven chuck are arranged oppositely. The tank (1) is clamped between the driving chuck and the driven chuck. The tank (1) includes a first tank body and a second tank body for welding. The joint of the two tank bodies is the welded seam. The tank (1) can be welded with the rotation of the chucks.

In this embodiment, there are two electric heating belts 4, and both of the two electric heating belts (4) are arranged around the tank (1). In other words, one electric heating belt (4) is arranged around the first tank body, and the other electric heating belt (4) is arranged around the second tank body. The electric heating belts (4) are distributed on both sides of the welded seam, and both are connected to the thermostat (7) through wires. The thermostat (7) is connected to the power source (6) through a wire, and the heating temperature of the electric heating belt (4) is controlled by the thermostat (7) to realize preheating of the tank (1) before welding, heat preservation during welding and post-welding heat treatment without transferring of the tank (1). A number of calipers (5) are provided on both sides of each electric heating belt (4), and the calipers (5) located on the same side of the electric heating belt (4) are also arranged around the tank (1). One end of each caliper (5) can operatively clamp the side of the electric heating belt (4), and another end of each caliper (5) is rotatably connected to a first roller (3) whose circumferential surface of the first roller (3) abuts against the circumferential surface of the tank (1). At least one hinge (11) is connected to each electric heating belt (4), and one end of the hinge (11) away from the electric heating belt (4) is in a fixed state. The hinge (11) tightens the electric heating belt (4), so that the electric heating belt (4) will not rotate with the tank (1). The electric heating belt (4) is connected to the first roller (3) through a clamp, so that the relative rotation of the electric heating belt (4) and the tank (1) becomes smoother. Since various wires are connected between the electric heating belt (4), the thermostat (7) and the power source (6), the hinges (11) prevent the electric heating belt (4) from rotating and the wires from knotting.

In one embodiment, the electric heating belt (4) includes a number of heating units connected in series through flexible connectors, each of the heating unit includes an outer layer and an inner layer, the outer layer is made of alumina ceramic, and the inner layer is made of nichrome wire. It should be noted that the number of heating units is selected according to the size of the tank (1), to ensure that the electric heating belt (4) can just be close to the outer surface of the tank (1) after winding the tank (1) once.

In one embodiment, the device also includes insulation batt (2) which is arranged between the electric heating belt (4) and the tank (1), and the insulation batt (2) is fixedly connected to the electric heating belt (4) and abuts against the tank (1). In the post-welding heat treatment stage, the heat preservation effect of the insulation batt (2) makes temperature more uniform and stable.

Figure 3:
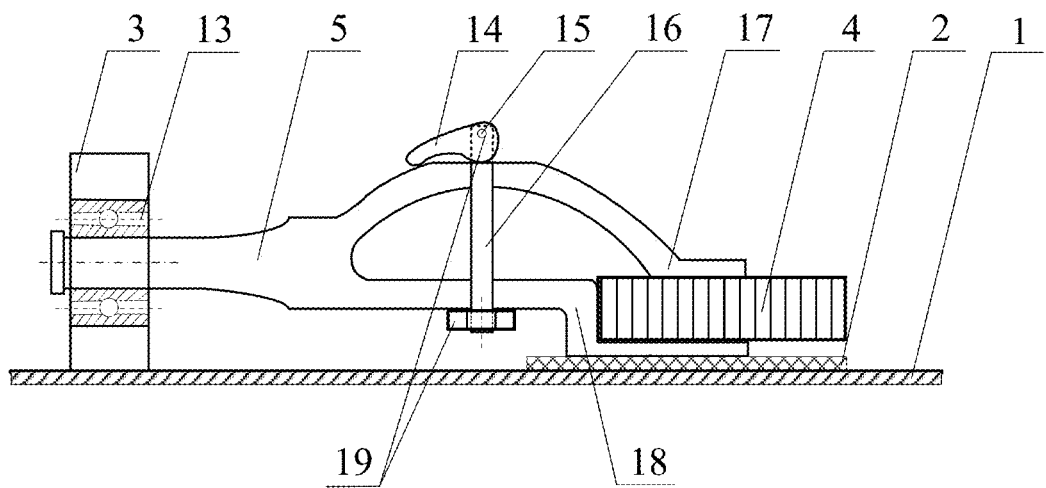
FIG. 3 is a schematic diagram of the caliper.

As shown in FIG. 3, FIG. 3 is a schematic diagram of the caliper. The calipers (5) include an upper jaw (17), a lower jaw (18), a circular shaft portion and a fastening mechanism; one end of the upper jaw (17) and the lower jaw (18) is fixedly connected to one end of the circular shaft portion, another end of the circular shaft portion is rotatably connected to the first roller (3) through the bearing (13), and another end of the upper jaw (17) and the lower jaw (18) respectively clamp the sides of the electric heating belt (4); the fastening mechanism includes pins (16), and pin holes are coaxially arranged on the upper jaw (17) and the lower jaw (18), and both ends of the pin (16) pass through the pin hole to tightly connect the upper jaw (17) and the lower jaw (18).

In one embodiment, the middle part of the upper jaw (17) is arc-shaped, the middle part of the lower jaw (18) is ladder-shaped. The first step is close to the circular shaft portion, and the second step is far away from the circular shaft portion. The connection between the first step and the second step forms a ladder-shaped surface. Pin holes are coaxially arranged on the arc segment of the upper jaw (17) and the first stepped segment of the lower jaw (18). After passing through the pin holes, the two ends of the pin (16) are respectively connected with the arc segment of the upper jaw (17) and the first step of the lower jaw (18). The side of the electric heating belt (4) abuts against the ladder-shaped surface formed at the junction of the first step and the second step, so as to prevent the electric heating belt (4) from sliding laterally.

In one embodiment, the fastening mechanism also includes nuts (19), the thread of which is matched with the threads at the two ends of the pin (16); after both ends of the pin (16) pass through the pin hole, the upper jaw (17) and the lower jaw (18) respectively fastened by the nuts (19).

In the other embodiment, the fastening mechanism also includes nuts (19) and a rotary latch (14), one end of the pin (16) is provided with a thread, another end of the pin (16) is hinged with the rotary latch (14) through a pivot (15), and one end of the pin (16) passes through the pin hole and is fastened to the lower jaw (18) through the nuts (19); the end of the rotary latch (14) presses against the outer surface of the upper jaw (17) in the locked state.

Figure 4:
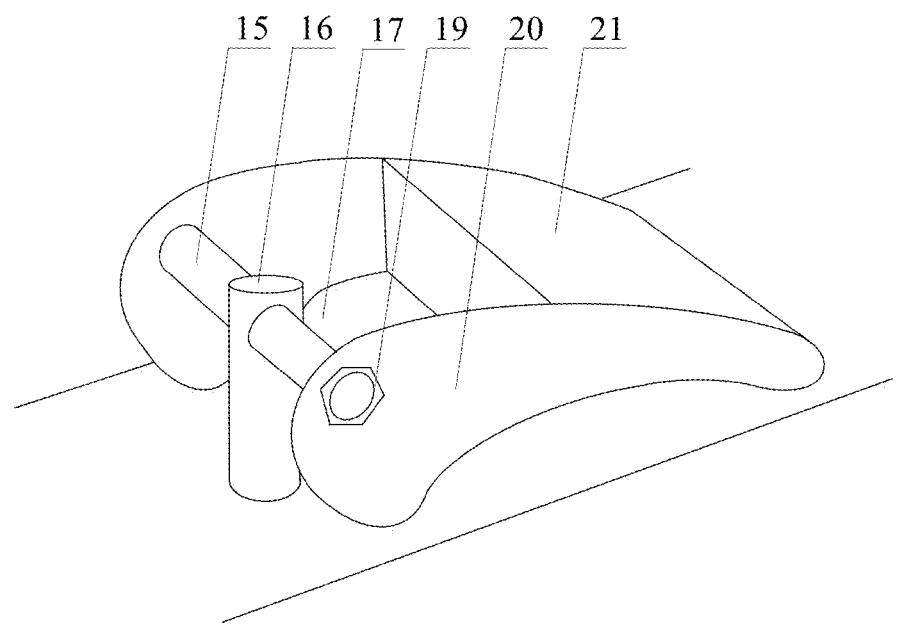
FIG. 4 is a schematic diagram of the rotary latch.

As shown in FIG. 4, FIG. 4 is a schematic diagram of the rotary latch. The rotary latch (14) includes an eccentric metal plate (20) and a counterweight shank (21). The eccentric metal plate (20) has two pieces. The two eccentric metal plates (20) are arranged oppositely at the end of the counterweight shank (21), and the pivot (15) passes through the holes in the two eccentric metal plates (20). The protrusion of the eccentric metal plate (20) presses against the outer surface of the upper jaw (17) in the locked state.

The device also includes a guide rail (12), and the two positioners (8) are fixedly arranged on the guide rail (12). The distance between the two positioners (8) is adjustable to fix tanks (1) of different sizes.

Figure 2:
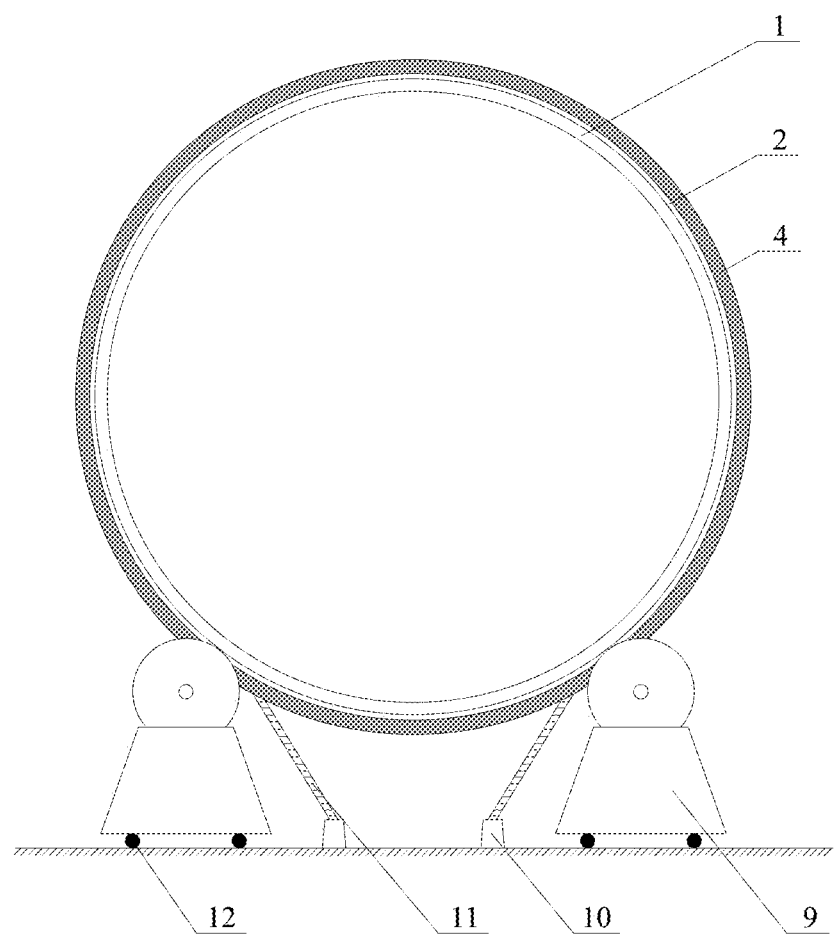
FIG. 2 is a section view schematic diagram of the device for preheating before welding and post-welding heat treatment of tank.

As shown in FIG. 2, FIG. 2 is a section view schematic diagram of the device for preheating before welding and post-welding heat treatment of tank. The device also includes support wheels (9), which includes a support bracket and a second roller, the support bracket is slidably arranged on the guide rail (12), and the second roller is rotatably arranged on the upper end of the support bracket; the second roller abuts against the tank (1), and the axis of the second roller is parallel to the rotation center line of the tank (1). In this embodiment, there are two groups of support wheels (9), and there are two support wheels (9) in each group. The two support wheels (9) in each group are arranged on the same side of the tank (1), and the one is arranged at the first tank body and the other is arranged at the second tank body. Two groups of support wheels 9 are arranged on both sides of the tank (1) oppositely. The number of support wheels (9) in each group can be selected according to actual needs.

Furthermore, each of the electric heating belts (4) is connected with two hinges (11), which are oppositely arranged on both sides of the tank (1). The end of the hinge (11) away from the electric heating belt (4) is connected to the ground through a ground lock (10) or a fixed support table.

The embodiment of this specification provides a device for preheating before welding and post-welding heat treatment of tank. Since the tank is clamped between the active chuck and the driven chuck, the tank body can be welded along with the rotation of the chuck. Two electric heating belts are arranged around the tank body and distributed on both sides of the welding seam. The heating temperature of the electric heating belt is controlled by a thermostat to realize preheating of the tank before welding, heat preservation during welding and post-welding heat treatment without transferring. The electric heating belt is connected to the first roller through calipers, and is tightened by hinges, so that the electric heating belt will not rotate with the tank body and heat evenly. The equipment connected with the electric heating belt will not be knotted, which improves the practicability.

In the description of the patent of the present invention, the orientation or installation relationship indicated by each component is based on the orientation or relationship shown in the drawings, which is only for the convenience of describing the patent and getting a general understanding of it. It is not that the device or element referred to must have a specific orientation and configuration. Therefore, it cannot be considered as a limitation to the present invention. After reading this specification, those skilled in the art can make modifications to this embodiment without creative contribution as needed. However, as long as it is within the scope of the claims of the present invention, it is protected by the patent law.

What is claimed is:

1. A device for preheating before welding and post-welding heat treatment of tank, comprising a first roller, two electric heating belts, calipers, a thermostat, two positioners and hinges, wherein:

an active chuck and a driven chuck are coaxially arranged on the two positioners, the active chuck and the driven chuck are arranged oppositely, and the tank is clamped between the active chuck and the driven chuck;

both of the electric heating belts are arranged around the tank and distributed on both sides of the welded seam, and both are connected to the thermostat through wires;

a number of calipers are provided on both sides of each electric heating belt, one end of each caliper can operatively clamp the side of the electric heating belt, and another end of each caliper is rotatably connected to a first roller whose circumferential surface of the first roller abuts against the circumferential surface of the tank;

at least one hinge is connected to each electric heating belt, and one end of the hinge away from the electric heating belt is in a fixed state.

2. The device for preheating before welding and post-welding heat treatment of tank according to claim 1, wherein the electric heating belt includes a number of heating units connected in series through flexible connectors, each of the heating unit includes an outer layer and an inner layer, the outer layer is made of alumina ceramic, and the inner layer is made of nichrome wire.

3. The device for preheating before welding and post-welding heat treatment of tank according to claim 1, wherein the calipers includes an upper jaw, a lower jaw, a circular shaft portion and a fastening mechanism; one end of the upper jaw and the lower jaw is fixedly connected to one end of the circular shaft portion, another end of the circular shaft portion is rotatably connected to the first roller, and another end of the upper jaw and the lower jaw respectively clamp the sides of the electric heating belt; the fastening mechanism includes pins, and pin holes are coaxially arranged on the upper jaw and the lower jaw, and both ends of the pin pass through the pin hole to tightly connect the upper jaw and the lower jaw.

4. The device for preheating before welding and post-welding heat treatment of tank according to claim 3, wherein the fastening mechanism also includes nuts, the thread of which is matched with the threads at the two ends of the pin; after both ends of the pin pass through the pin hole, the upper jaw and the lower jaw respectively fastened by the nuts.

5. The device for preheating before welding and post-welding heat treatment of tank according to claim 3, wherein the fastening mechanism also includes nuts and a rotary latch, one end of the pin is provided with a thread, another end of the pin is hinged with the rotary latch through a pivot, and one end of the pin passes through the pin hole and is fastened to the lower jaw through the nuts; the end of the rotary latch presses against the outer surface of the upper jaw in the locked state.

6. The device for preheating before welding and post-welding heat treatment of tank according to claim 3, wherein the middle part of the upper jaw is arc-shaped, the middle part of the lower jaw is ladder-shaped, and pin holes are coaxially arranged on the arc segment of the upper jaw and the first stepped segment of the lower jaw.

7. The device for preheating before welding and post-welding heat treatment of tank according to claim 1, wherein the device also includes insulation batt which is arranged between the electric heating belt and the tank, and the insulation batt is fixedly connected to the electric heating belt and abuts against the tank.

8. The device for preheating before welding and post-welding heat treatment of tank according to claim 1, wherein each of the electric heating belts is connected with two hinges, which are oppositely arranged on both sides of the tank.

9. The device for preheating before welding and post-welding heat treatment of tank according to claim 1, wherein the device also includes a guide rail, and the two positioners are fixedly arranged on the guide rail.

10. The device for preheating before welding and post-welding heat treatment of tank according to claim 9, wherein the device also includes support wheels, which includes a support bracket and a second roller, the support bracket is slidably arranged on the guide rail, and the second roller is rotatably arranged on the upper end of the support bracket; the second roller abuts against the tank, and the axis of the second roller is parallel to the rotation center line of the tank.

\* \* \* \* \*